(12) United States Patent
Komuro et al.

(10) Patent No.: US 9,532,075 B2
(45) Date of Patent: Dec. 27, 2016

(54) IMAGE PROCESSOR

(71) Applicant: MegaChips Corporation, Osaka-shi (JP)

(72) Inventors: Takeaki Komuro, Osaka (JP); Nobuyuki Takasu, Osaka (JP); Kazuhiro Saito, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 233 days.

(21) Appl. No.: 14/219,148

(22) Filed: Mar. 19, 2014

(65) Prior Publication Data

US 2014/0286435 A1 Sep. 25, 2014

(30) Foreign Application Priority Data

Mar. 22, 2013 (JP) .................. 2013-060950

(51) Int. Cl.
  *H04N 19/13* (2014.01)
  *H04N 19/82* (2014.01)
  *H04N 19/70* (2014.01)
  *H04N 19/42* (2014.01)

(52) U.S. Cl.
  CPC .............. *H04N 19/82* (2014.11); *H04N 19/13* (2014.11); *H04N 19/42* (2014.11); *H04N 19/70* (2014.11)

(58) Field of Classification Search
  None
  See application file for complete search history.

(56) References Cited

U.S. PATENT DOCUMENTS 5,481,309 A * 1/1996 Juri ...................... H04N 5/9264
  375/240.03
2009/0219989 A1* 9/2009 Tanaka ................. G11B 27/034
  375/240.01
2013/0326201 A1* 12/2013 Gopal ................. G06F 9/30043
  712/225

FOREIGN PATENT DOCUMENTS

JP      2009-71598      4/2009

* cited by examiner

*Primary Examiner* — Christopher Findley
(74) *Attorney, Agent, or Firm* — Oblon, McClelland, Maier & Neustadt, L.L.P.

(57) ABSTRACT

The image processor includes a ⅓ multiplier circuit that approximately multiplies an input value X by ⅓. The ⅓ multiplier circuit includes a loop operation circuit that repeatedly perform a predetermined operation by loops, and a setting circuit that sets a required number of loops in the loop operation circuit. The loop operation circuit includes a register that receives an input of an input value, a bit shift circuit that performs bit shift by 2 bits to the right on a value output from the register, and an adder circuit that adds an input value and a value output from the bit shift circuit, and inputs the added value to the register.

4 Claims, 4 Drawing Sheets

FIG. 5

| Value j | Position of MSB | Required number of loops |
|---|---|---|
| 0000_0000_0000_0000_0000 | 0 | 0 |
| 0000_0000_0000_0000_0001 | 1 | |
| 0000_0000_0000_0000_0010 | 2 | |
| 0000_0000_0000_0000_0100 | 3 | 1 |
| 0000_0000_0000_0000_1000 | 4 | |
| 0000_0000_0000_0001_0000 | 5 | 2 |
| 0000_0000_0000_0010_0000 | 6 | |
| 0000_0000_0000_0100_0000 | 7 | 3 |
| 0000_0000_0000_1000_0000 | 8 | |
| 0000_0000_0001_0000_0000 | 9 | 4 |
| 0000_0000_0010_0000_0000 | 10 | |
| 0000_0000_0100_0000_0000 | 11 | 5 |
| 0000_0000_1000_0000_0000 | 12 | |
| 0000_0001_0000_0000_0000 | 13 | 6 |
| 0000_0010_0000_0000_0000 | 14 | |
| 0000_0100_0000_0000_0000 | 15 | 7 |
| 0000_1000_0000_0000_0000 | 16 | |
| 0001_0000_0000_0000_0000 | 17 or upper | 8 |

IMAGE PROCESSOR

CROSS-REFERENCE TO RELATED APPLICATIONS

This application claims priority to Japanese Patent Application No. JP2013-060950. The entire disclosure of Japanese Patent Application No. JP2013-060950 is hereby incorporated herein by reference.

BACKGROUND OF THE INVENTION

Field of the Invention

The present invention relates to image processors, and more particularly, to an image processor that derives a CABAC_ZERO_WORD to be included in Network Abstraction Layer (NAL) unit packets in generating NAL unit packets of the H.264 compression coding format.

Description of the Background Art

The H.264 compression coding format, one of compression coding formats for moving images, requires as an H.264 standard to derive a parameter called CABAC_ZERO_WORD to insert into a stream in employing Context-Adaptive Binary Arithmetic Coding (CABAC) as a coding format.

JP2009-071598A describes various examples of ⅓ multipliers configured with multiple bit shift circuits and multiple adders.

Derivation of a CABAC_ZERO_WORD is normally performed with a software program written in, for example, the C language. Since the C language allows for floating-point arithmetic, employing the C language realizes operations in conformity with an algorithm for calculating CABAC_ZERO_WORD as required by the H.264 standard.

In methods where the CABAC_ZERO_WORD is calculated with a software program, however, calculation of the CABAC_ZERO_WORD occupies processing power of a CPU, causing an elongated time required to generate NAL unit packets for a CPU having a low processing speed. Thus use of methods where the CABAC_ZERO_WORD is calculated with a software program is limited in light of increasing frame rates and compatibility with networks of moving images accompanied by increasing loads for a CPU.

SUMMARY OF THE INVENTION

It is an object of the present invention to provide an image processor capable of deriving a CABAC_ZERO_WORD defined in H.264 compression coding format simply and with high speed, employing hardware.

An image processor according to a first aspect of the present invention derives a predetermined parameter to be included in a Network Abstraction Layer (NAL) unit packet in generating a NAL unit packet in compression coding of a moving image. The image processor includes a ⅓ multiplier circuit that approximately multiplies an input value by ⅓. The ⅓ multiplier circuit includes a loop operation circuit that repeatedly performs a predetermined operation by loops, and a setting circuit that sets a required number of loops in the loop operation circuit. The loop operation circuit includes a register that receives an input of an input value, a bit shift circuit that performs bit shift by 2 bits to the right on a value output from the register, and an adder circuit that adds an input value and a value output from the bit shift circuit, and inputs the added value to the register.

The image processor according to the first aspect includes a ⅓ multiplier circuit that approximately multiplies an input value by ⅓. Thus the CABAC_ZERO_WORD that requires ⅓ multiplication defined in the H.264 compression coding format is derived simply and with high speed, employing hardware.

The ⅓ multiplier circuit includes a loop operation circuit that repeatedly performs a predetermined operation by loops. Thus the loop operation circuit needs no more than one bit shift circuit and no more than one adder circuit. Consequently, the circuit configuration is simplified in comparison with a configuration where multiple bit shift circuits having different bit shift amounts are connected in parallel and the values output from each bit shift circuit are added with multiple adders.

The ⅓ multiplier circuit also includes a setting circuit that sets a required number of loops in the loop operation circuit. Thus in comparison with a configuration where a fixed number of bit shift circuits are connected in parallel, the shift-and-sum operation is repeatedly performed sufficient times, without lacking in a required number, and in consequence, highly accurate ⅓ multiplication is realized. Moreover, excessive repeat of shift-and-sum operation exceeding a required number is prevented, and in consequence, highly efficient ⅓ multiplication is realized.

Preferably, the setting circuit sets the required number of loops based on a number of effective bits of an output value from a circuit preceding the ⅓ multiplier circuit.

Thus the setting circuit achieves the optimal settings of the required number of loops depending on the number of effective bits. Consequently, in comparison with a configuration where a fixed number of bit shift circuits are connected in parallel, highly accurate and highly efficient ⅓ multiplication depending on the number of effective bits is realized.

Preferably, ⅓ multiplication of X is defined in an approximate expression $$\left[X + \left\{\sum_{i=1}^{N-2}(X >> (2^*i))\right\} + 3\right] >> 2$$

where X is the input value and N is the required number of loops, and the ⅓ multiplier circuit further includes an adder circuit that adds 3 to a value output from the loop operation circuit and a bit shift circuit that performs bit shift by 2 bits to the right on a value output from the adder circuit.

By rounding down the term X>>2(N−1), which is one or two bits, and instead adding the largest value of 2 bits "3", an approximate value larger than a true value is obtained in approximate multiplication by ⅓. Consequently, an approximate value of CABAC_ZERO_WORD smaller than a true value, which is not in conformity with the standard, is appropriately prevented.

Preferably, the image processor further includes an adder circuit that adds 2 to a value j, where j is an output value from the circuit preceding the ⅓ multiplier circuit, so as to generate an input value to the ⅓ multiplier circuit.

Generating the input value to the ⅓ multiplier circuit by adding 2 to j achieves calculation of the CABAC_ZERO_WORD as a rounded-up approximate value of ⅓ multiplication.

Preferably, the predetermined parameter is a CABAC_ZERO_WORD in H.264 compression coding format.

The CABAC_ZERO_WORD defined in the H.264 compression coding format is derived simply and with high speed, employing hardware.

The present invention achieves deriving of the CABAC_ZERO_WORD defined in the H.264 compression coding format simply and with high speed, employing hardware.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating a relation between an output value and a required number.

DETAILED DESCRIPTION OF THE INVENTION

Description of the Preferred Embodiments

Figure 1:
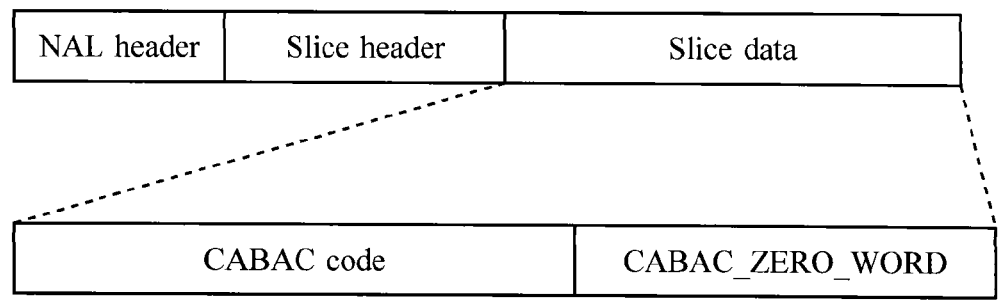
FIG. 1 is a diagram illustrating a NAL unit packet in the H.264 compression coding format.

Preferred embodiments of the present invention are described in detail below referring to the drawings. It should be noted that identical reference numerals throughout the drawings indicate identical or equivalent elements.

FIG. 1 is a diagram illustrating a Network Abstraction Layer (NAL) unit packet in the H.264 compression coding format. NAL unit packets include a NAL header, a slice header, and slice data. According to the H.264 standard, use of Context-Adaptive Binary Arithmetic Coding (CABAC) as a coding format requires insertion of a 3-byte parameter called CABAC_ZERO_WORD at the end of CABAC codes.

The H.264 standard defines a formula for calculating the CABAC_ZERO_WORD as follows:

```
k =ceil ( (ceil (3* (32*BinCountsInNALunits-RawMbBits*PicSizeInMbs)
/1024)
    -NumBytesInVclNALunits) /3)
if ( k <=0) {number of cabac_zero_word=0}
else {number of cabac_zero_word=k }
```

Here, the parameters BinCountsInNALunits, RawMbBits, PicSizeInMbs, and NumBytesInVclNALunits are all integers.

The image processor of the present embodiment calculates the CABAC_ZERO_WORD not by software processing with a CPU but with hardware. The image processor thus includes a circuit for newly defining an approximate expression to calculate the CABAC_ZERO_WORD and realizing an operation in accordance with the approximate expression.

The approximate expression to calculate the CABAC_ZERO_WORD is firstly described.

In the above-described expression to calculate the CABAC_ZERO_WORD defined in the H.264 standard, given the following Expression (1):

```
k =ceil ( (ceil (3* (32*BinCountsInNALunits-RawMbBits*PicSizeInMbs)
/1024)
    -NumBytesInVclNALunits) /3)
if ( k <=0) {number of cabac_zero_word=0}
else {number of cabac_zero_word=k }
``` the following Expression (2) holds:

$$k = \text{ceil}(j/3) \quad (2)$$

In consideration of implementing hardware, the operation of Expression (1) is realized with a bit shift operation in the following Expression (3):

$$j = \text{ceil}(3*(\text{BinCountsInNALunits} \ll 5 - \text{RawMbBits}*\text{PicSizeInMbs}) \gg 10) - \text{NumBytesInVclNALunits} \quad (3)$$

In the expressions herein, "$\ll$" means bit shift to the left (i.e., to an upper digit), and "$\gg$" means bit shift to the right (i.e., to a lower digit). For example, "$\ll 5$" in the above Expression (3) means bit shift by 5 bits to the left, and "$\gg 10$" means bit shift by 10 bits to the right.

By expanding ceil (rounding up) in the expression, Expression (3) is formulated as:

$$j = ((3*(\text{BinCountsInNALunits} \ll 5 - \text{RawMbBits}*\text{PicSizeInMbs}) + 1023) \gg 10) - \text{NumBytesInVclNALunits} \quad (4)$$

The image processor of the present embodiment performs the operation of Expression (4) with a preceding circuit 1 described below.

By expanding ceil, Expression (2) is formulated as:

$$k = (j+2)/3 \quad (5)$$

Given $$X = j+2$$

then the following Expression (5) holds:

$$k = X/3 \quad (6)$$

Then in Expression (6), approximate multiplication of X by ⅓ is obtained as follows:

$$X/3 = \sum_{i=1}^{N} (X \gg (2*i)) \quad (7)$$

Expanding Expression (7) leads to $$X/3 = (X \gg 2) + (X \gg 4) + \ldots + (X \gg 2N) \quad (8)$$

$$X/3 = \{X + (X \gg 2) + (X \gg 4) + \ldots + (X \gg 2(N-1))\} \gg 2 \quad (9)$$

and Expression (8) is further deformed to

In accordance with the H.264 standard, the approximate value of the CABAC_ZERO_WORD can be larger than a true value, but cannot be smaller. Thus in order to round up to make sure that the approximate value of X/3 is larger than the true value, in Expression (9), the term $X \gg 2(N-1)$, which is one or two bits, is rounded down, and instead, the largest value of two bits "3" is added. Thereby Expression (9) is modified to $$X/3 = \{X + (X \gg 2) + (X \gg 4) + \ldots + (X \gg 2(N-2)) + 3\} \gg 2 \quad (10)$$

and then Expression (10) is generalized to obtain the following approximate expression:

$$X/3 = \left[X + \left\{\sum_{i=1}^{N-2}(X >> (2*i))\right\} + 3\right] >> 2 \quad (11)$$

The image processor of the present embodiment performs the operation of Expression (11) with a subsequent circuit 2 described below.

Circuit configurations to perform operations of Expressions (4) and (11) are now illustrated.

Figure 2:
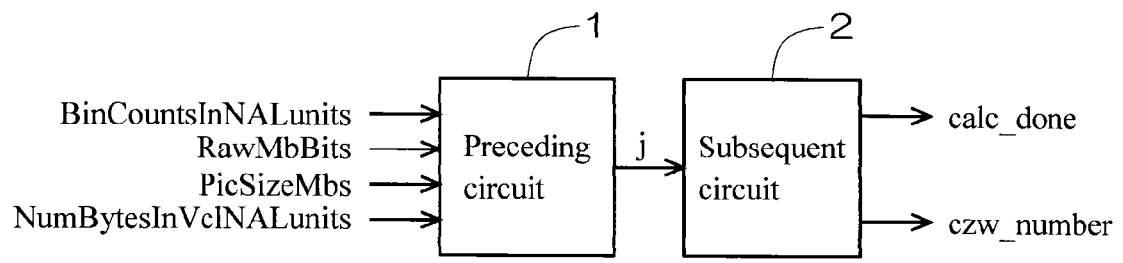
FIG. 2 is a diagram illustrating a circuit configuration for calculating a CABAC_ZERO_WORD in the image processor of the present embodiment.

FIG. 2 is a diagram illustrating a circuit configuration for calculating the CABAC_ZERO_WORD in the image processor of the present embodiment. As illustrated in FIG. 2, the image processor includes a preceding circuit 1 and a subsequent circuit 2.

The preceding circuit 1 receives an input of parameters BinCountsInNALunits, RawMbBits, PicSizeInMbs, and NumBytesInVclNALunits, which are required for calculation of the CABAC_ZERO_WORD. The preceding circuit 1 performs the above-described operation of Expression (4) based on these parameters, so as to output an output value j.

The output value j from the preceding circuit 1 is input to the subsequent circuit 2. The subsequent circuit 2 performs the above-described operation of Expression (11) based on the output value j, so as to output the CABAC_ZERO_WORD (czw_number).

Figure 3:
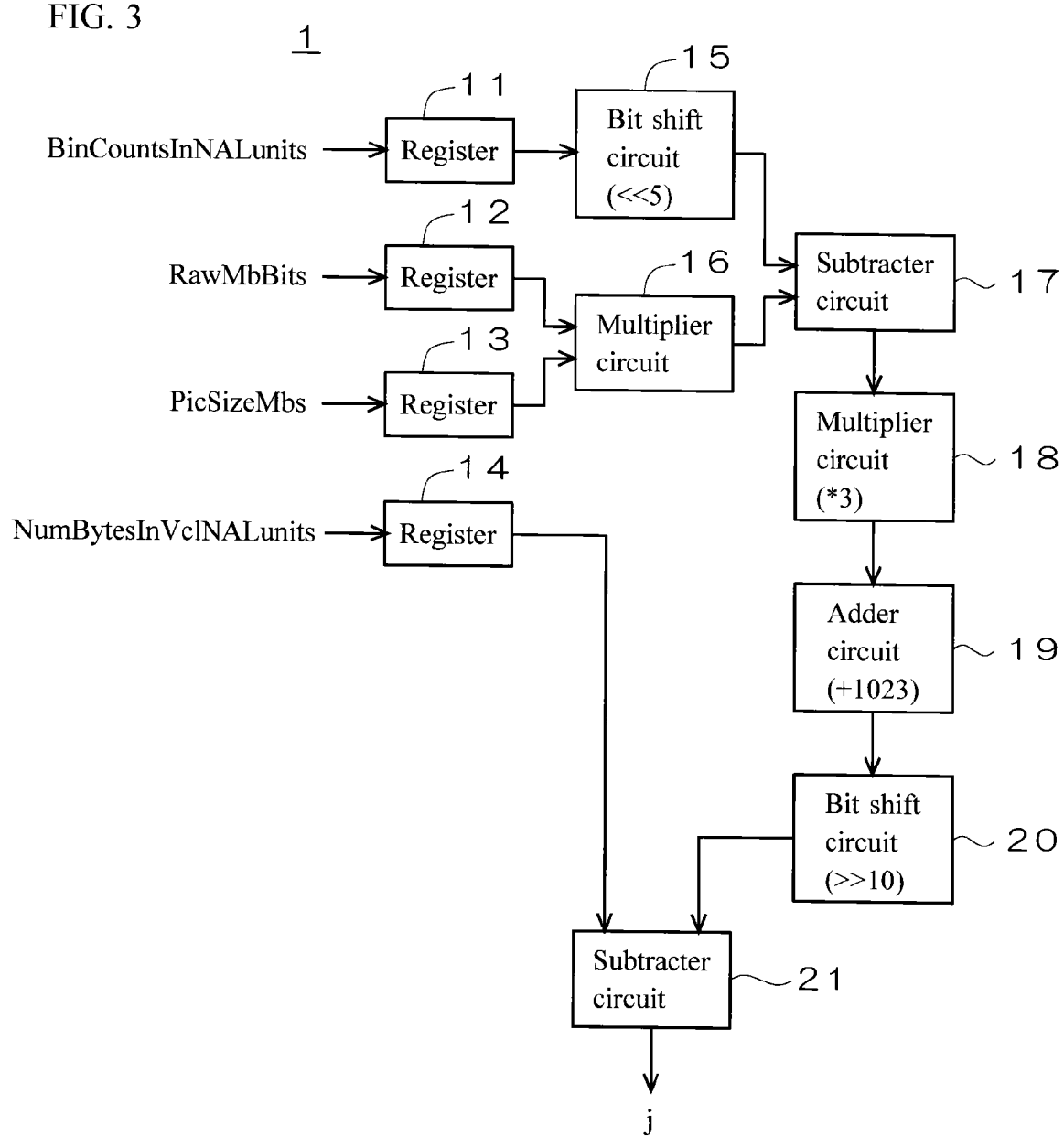
FIG. 3 is a diagram illustrating a circuit configuration of a preceding circuit in detail.

FIG. 3 is a diagram illustrating a circuit configuration of the preceding circuit 1 in detail. FIG. 3 illustrates the relation of connection in the preceding circuit 1 including registers 11 to 14, a bit shift circuit 15, a multiplier circuit 16, a subtracter circuit 17, a multiplier circuit 18, an adder circuit 19, a bit shift circuit 20, and a subtracter circuit 21.

The BinCountsInNALunits is stored in the register 11. The bit shift circuit 15 performs 5-bit shift to the left on a value output from the register 11.

The RawMbBits is stored in the register 12. The PicSizeInMbs is stored in the register 13. The multiplier circuit 16 multiplies a value output from the register 12 and a value output from the register 13.

The subtracter circuit 17 subtracts a value output from the multiplier circuit 16 from a value output from the bit shift circuit 15.

The multiplier circuit 18 multiplies a value output from the subtracter circuit 17 by "3".

The adder circuit 19 adds "1023" to a value output from the multiplier circuit 18.

The bit shift circuit 20 performs 10-bit shift to the right on a value output from the adder circuit 19.

The NumBytesInVclNALunits is stored in the register 14. The subtracter circuit 21 subtracts a value output from register 14 from a value output from the bit shift circuit 20. Thus a value j is obtained as an output from the subtracter circuit 21.

Figure 4:
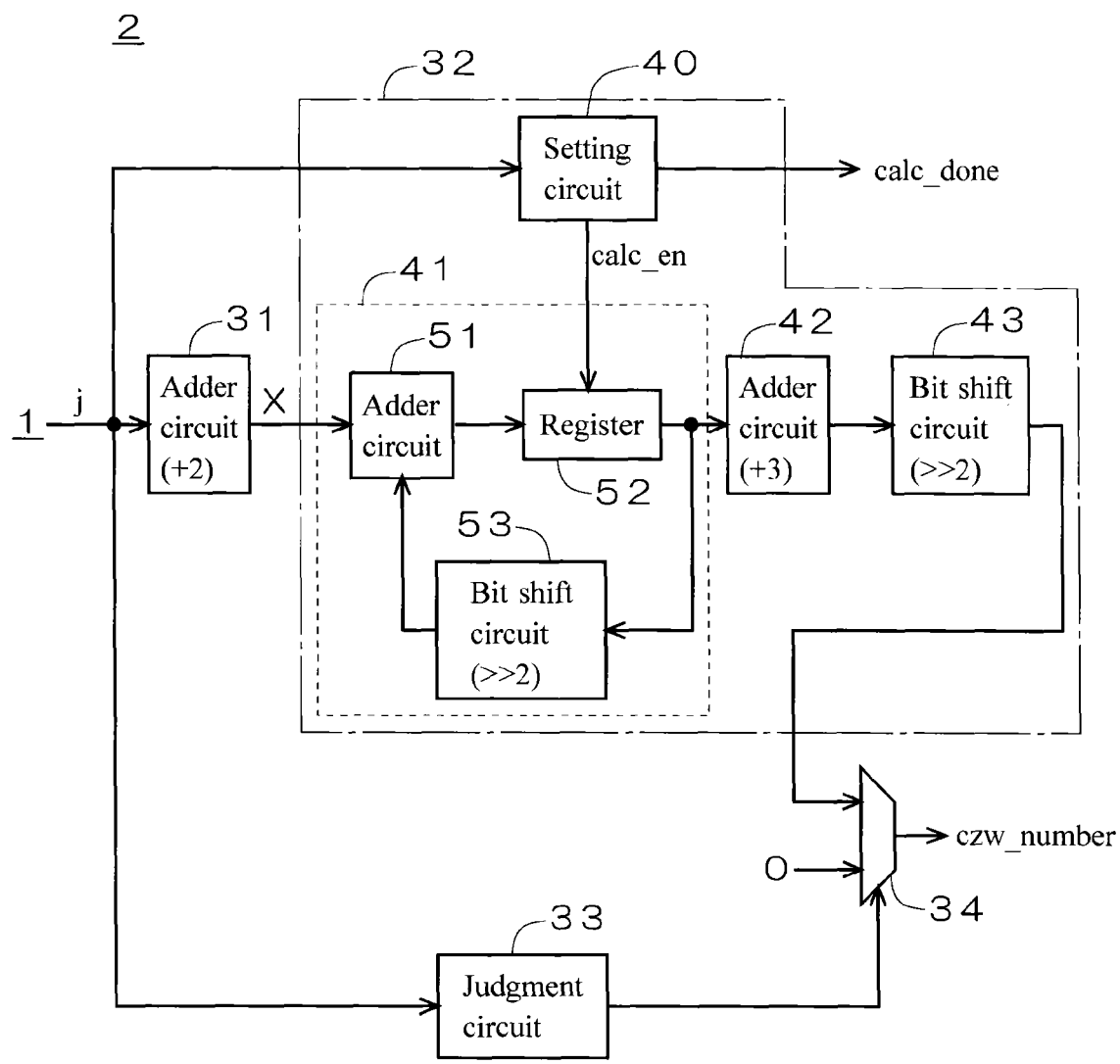
FIG. 4 is a diagram illustrating a circuit configuration of a subsequent circuit in detail.

FIG. 4 is a diagram illustrating a circuit configuration of the subsequent circuit 2 in detail. FIG. 4 illustrates the relation of connection in the subsequent circuit 2 including an adder circuit 31, a ⅓ multiplier circuit 32, a judgment circuit 33, and a selector 34. The ⅓ multiplier circuit 32 includes a setting circuit 40, a loop operation circuit 41, an adder circuit 42, and a bit shift circuit 43. The loop operation circuit 41 includes an adder circuit 51, a register 52, and a bit shift circuit 53.

The output value j from the preceding circuit 1 is input to the adder circuit 31, the setting circuit 40, and the judgment circuit 33.

The adder circuit 31 adds "2" to the output value j to generate an input value X to the ⅓ multiplier circuit 32.

The setting circuit 40 sets a required number N of loops in the loop operation circuit 41, based on the number of effective bits of the output value j. The setting circuit 40 repeatedly shifts the output value j to the right by 2 bits, and sets a required number N at the maximum number of shifts before the value after shifts becomes smaller than "4".

FIG. 5 is a diagram illustrating a relation between the output value j and the required number N. As illustrated in FIG. 5, the setting circuit 40 sets the required number of loops N=0 if the most significant bit of the value j is positioned at 2 bits from the least significant bit or lower (i.e., if the effective bits are 2 bits or fewer), N=1 if 3 or 4 bits, N=2 if 5 or 6 bits, N=3 if 7 or 8 bits, N=4 if 9 or 10 bits, N=5 if 11 or 12 bits, N=6 if 13 or 14 bits, N=7 if 15 or 16 bits, and N=8 if 17 bits or upper. Since the term X>>2(N−1) is replaced with "3" in deforming Expression (9) to Expression (10), N−1 loops are performed for the required number N. In the example illustrated in FIG. 5, the maximum of the required number N is set at "8" in order to simplify the operation and shorten required time. The maximum time, however, does not have to be limited, for accuracy in ⅓ multiplication increases with more loops.

Referring to FIG. 4, the judgment circuit 33 judges whether the output value j is larger than 0, or 0 or smaller.

The adder circuit 51 inputs the input value X to the register 52. The input value X is stored in the register 52.

The bit shift circuit 53 performs 2-bit shift to the right on a value output from the register 52.

The adder circuit 51 adds the input value X and a value output from the bit shift circuit 53, and inputs the added value to the register 52. Thus the value stored in the register 52 is updated to the added value input from the adder circuit 51. Loop operation by the loop operation circuit 41 is repeated until the number of loops performed reaches (N−1) as set by the setting circuit 40.

When the number of loops performed reaches (N−1), the adder circuit 42 adds "3" to a value output from the register 52.

The bit shift circuit 43 performs 2-bit shift to the right on a value output from the adder circuit 42.

The selector 34, based on the result of judgment by the judgment circuit 33, outputs a value output from the bit shift circuit 43 as CABAC_ZERO_WORD if the output value j is larger than 0, while outputting "0" as CABAC_ZERO_WORD if the output value j is 0 or smaller.

As described above, the subsequent circuit 2 of the image processor according to the present embodiment includes the ⅓ multiplier circuit 32 that approximately multiplies the input value X by ⅓. Thus the CABAC_ZERO_WORD that requires ⅓ multiplication defined in the H.264 compression coding format is derived simply and with high speed, employing hardware.

The ⅓ multiplier circuit 32 includes the loop operation circuit 41 that repeatedly performs a predetermined operation with loops. Thus the loop operation circuit 41 needs no more than one bit shift circuit 53 and no more than one adder circuit 51. Consequently, the circuit configuration is simplified in comparison with a configuration where multiple bit shift circuits having different bit shift amounts are connected in parallel and the values output from each bit shift circuit are added with multiple adders.

Furthermore, the ⅓ multiplier circuit 32 includes the setting circuit 40 that sets the required number N of loops in the loop operation circuit 41. Thus in comparison with a configuration where a fixed number of bit shift circuits are connected in parallel, the shift-and-sum operation is repeatedly performed sufficient times, without lacking in a required number, and in consequence, highly accurate ⅓ multiplication is realized. Moreover, excessive repeat of shift-and-sum operation exceeding a required number is prevented, and in consequence, highly efficient ⅓ multiplication is realized.

The setting circuit 40 of the image processor according to the present embodiment sets the required number N of loops, based on the number of effective bits of the output value j from the preceding circuit 1. Thus the setting circuit 40 achieves the optimal settings of the required number N of loops depending on the number of effective bits. Consequently, in comparison with a configuration where a fixed number of bit shift circuits are connected in parallel, highly accurate and highly efficient ⅓ multiplication depending on the number of effective bits is realized.

In the image processor according to the present embodiment, ⅓ multiplication of the input value X is defined by the approximate expression $$\left[X + \left\{\sum_{i=1}^{N-2} (X >> (2*i))\right\} + 3\right] >> 2$$

By rounding down the term X>>2(N−1), which is one or two bits, and instead adding the largest value of 2 bits "3", an approximate value larger than a true value is obtained in approximate multiplication by ⅓. Consequently, an approximate value of CABAC_ZERO_WORD smaller than a true value, which is not in conformity with the standard, is appropriately prevented.

The image processor according to the present embodiment includes the adder circuit 31 that adds "2" to the output value j from the preceding circuit 1, so as to generate the input value X to the ⅓ multiplier circuit 32. Generating the input value X to the ⅓ multiplier circuit 32 by adding "2" to the output value j achieves calculation of the CABAC_ZERO_WORD as a rounded-up approximate value of ⅓ multiplication.

While the invention has been described in detail, the foregoing description is in all aspects illustrative and not restrictive. It is understood that numerous other modifications and variations can be devised without departing from the scope of the invention.

What is claimed is:

1. An image processor that derives a predetermined parameter to be included in a Network Abstraction Layer (NAL) unit packet in generating a NAL unit packet in compression coding of a moving image, the image processor comprising:

a ⅓ multiplier circuit configured to approximately multiply an input value by ⅓, the ⅓ multiplier circuit including a loop operation circuit configured to repeatedly perform a predetermined operation by loops; and a setting circuit configured to set a required number of loops in the loop operation circuit, wherein the loop operation circuit includes
a register configured to receive an input of an input value;
a bit shift circuit configured to perform bit shift by 2 bits to the right on a value output from the register; and
a first adder circuit configured to add an input value and a value output from the bit shift circuit, and input an added value to the register, ⅓ multiplication of X is defined in an approximate expression $$\left[X + \left\{\sum_{i=1}^{N-2} (X >> (2*i))\right\} + 3\right] >> 2$$

where X is the input value, N is the required number of loops, and an operator >> means bit shift to the right by an integer next to the operator, and the ⅓ multiplier circuit further includes
a second adder circuit configured to add 3 to a value output from the loop operation circuit; and
a bit shift circuit configured to perform bit shift by 2 bits to the right on a value output from the second adder circuit.

2. The image processor according to claim 1, wherein the setting circuit sets the required number of loops based on a number of effective bits of an output value from a circuit preceding the ⅓ multiplier circuit.

3. The image processor according to claim 1, further comprising:
an adder circuit configured to add 2 to a value j, where j is an output value from a circuit preceding the ⅓ multiplier circuit, so as to generate an input value to the ⅓ multiplier circuit.

4. The image processor according to claim 3, wherein the predetermined parameter is a CABAC_ZERO_WORD in an H.264 compression coding format.

* * * * *